US005361681A

United States Patent [19]

Hedström et al.

[11] Patent Number: 5,361,681

[45] Date of Patent: Nov. 8, 1994

[54] PROGRAM CONTROLLED COOKING SYSTEM USING VIDEO DATA COLLECTION

[75] Inventors: Per G. Hedström, Stockholm, Sweden; Mario Filippetti; Enzo Zanetti, both of Udine, Italy

[73] Assignee: Zeltron S.p.A., Italy

[21] Appl. No.: 38,455

[22] Filed: Mar. 29, 1993

[30] Foreign Application Priority Data

Feb. 4, 1992 [IT] Italy ........................ PN92 A 000025

[51] Int. Cl.[5] ........................ A21B 1/00; A21B 3/00; G01K 11/16; F24C 7/08

[52] U.S. Cl. ........................ 99/331; 99/325; 219/413; 219/490; 219/506; 364/138; 364/400

[58] Field of Search ................ 99/325, 326, 328, 327, 99/331, 334, 335, 468; 219/451, 448, 413, 453, 490, 506, 10.55 B; 364/138, 480, 550, 419.2, 400

[56] References Cited

U.S. PATENT DOCUMENTS

| | | | |
|---|---|---|---|
| 3,827,345 | 8/1974 | Willson | 99/327 |
| 3,999,040 | 12/1976 | Ellis | 219/543 |
| 4,459,449 | 7/1984 | Hirata | 99/325 |
| 4,499,357 | 2/1985 | Kojima | 99/333 |
| 4,568,927 | 2/1986 | Fowler | 99/328 |
| 4,628,439 | 12/1986 | Fowler et al. | 364/138 |
| 4,701,596 | 10/1987 | Schirmer et al. | 219/506 |
| 4,742,455 | 5/1988 | Schreyer | 364/400 |
| 4,972,060 | 11/1990 | Edamura | 99/325 |
| 5,183,984 | 2/1993 | Nakagawa | 219/506 |
| 5,221,817 | 6/1993 | Ota | 219/492 |

FOREIGN PATENT DOCUMENTS

| | | | |
|---|---|---|---|
| 0232802 | 5/1991 | European Pat. Off. . | |
| 3533997 | 9/1985 | Germany . | |
| 3904407 | 8/1990 | Germany | 219/506 |

*Primary Examiner*—Timothy F. Simone

*Attorney, Agent, or Firm*—Pearne, Gordon, McCoy & Granger

[57] ABSTRACT

Cooking system comprising a cooking area (1) with actuators (2) which are adjustable to change relevant parameters determining the cooking process of a food. A television camera (3) monitors the cooking area (1) and drives a processor (5) with information relating to the operative conditions in the cooking area (1) . The processor (5) is associated with a memory device (7) storing typical cooking programs consisting each of a different combination of process parameters. The processor (5) is responsive to the incoming data to select the most suitable among the stored cooking programs, whereby it compares the parameters thereof with the corresponding information from the camera (3) to control the actuators (2) with respective error signals. The cooking process is regulated in a fully automatic manner, based on the actual conditions of the food being cooked.

4 Claims, 3 Drawing Sheets

| | | | | | | | | | | | | | |
|---|---|---|---|---|---|---|---|---|---|---|---|---|---|
| 00 | 00 | 00 | 00 | 00 | 00 | 00 | 00 | 00 | 00 | 00 | 00 | XX | XX |
| 00 | 00 | 00 | 00 | F0 | F3 | EF | F0 | FF | E8 | F0 | 00 | XX | XX |
| 00 | 00 | 00 | 00 | F0 | F0 | F1 | F1 | EF | F0 | F1 | 00 | XX | XX |
| 3F | 3F | 00 | 00 | F4 | F4 | F5 | F6 | F6 | F7 | F8 | 00 | XX | XX |
| 00 | 00 | 00 | 00 | F3 | F2 | F3 | F3 | F2 | F2 | F2 | 00 | XX | XX |
| 00 | 00 | 00 | 00 | F0 | F0 | F4 | F4 | F1 | F0 | F2 | 00 | XX | XX |
| 00 | 00 | 00 | 00 | 00 | 00 | 00 | 00 | F1 | F2 | F0 | 00 | XX | XX |
| 00 | 00 | 00 | 00 | 00 | 00 | 00 | E9 | E9 | EF | 7F | 7F | XX | XX |
| 00 | 00 | 00 | F0 | F0 | F0 | F2 | E7 | F1 | F2 | B0 | 00 | XX | XX |
| XX | XX | XX | XX | XX | XX | XX | XX | XX | XX | XX | XX | XX | XX |
| XX | XX | XX | XX | XX | XX | XX | XX | XX | XX | XX | XX | XX | XX |

PROGRAM CONTROLLED COOKING SYSTEM USING VIDEO DATA COLLECTION

BACKGROUND OF THE INVENTION

The present invention relates to a system for cooking food both in the home and in professional kitchens, which is adapted to control in a fully automatic way the food cooking processes it is performing.

Cooking appliances are known to be in many cases, equipped so as to be capable of automatically monitoring the cooking progress, or the state of cooking, of any given food item. For instance, the EP-B-O 232 802 discloses the use of opto-electronic means that are adapted to detect the variations in the infrared-light transmission and/or reflection coefficient of the food being cooked in view of automatically de-energizing the heating elements as soon as said variations decrease below a pre-determined value that is indicative of a condition of completed cooking.

Other cooking appliances are also known, for instance from DE-A-3 533 997, to be equipped with sensor means that are adapted to detect the presence and/or the size of a cooking pan or utensil in order to regulate correspondingly, in an automatic way, the exact area of the heating elements that has to be energized each time.

However, such solutions enable the problem of an actual fully automatic control of a food cooking process to be only partially solved, since they are practically limited to the control of single, particular aspects thereof, while leaving out of consideration the various other parameters that, according to the nature and properties of the food being cooked, contribute to making up and determining the actual cooking process. This practically means that, in the cooking appliances as they are known from the prior art, the actual control of each food cooking process performed therewith is mainly determined by actions performed manually by the user.

SUMMARY OF THE INVENTION

It would on the other hand be therefore desirable, and it is actually one of the objects of the present invention, to provide a food cooking system which is arranged to control in a fully automatic, optimal way the entire process involved in cooking a food.

Such an aim is reached according to the present invention in an automatically controlled cooking system comprising the features and characteristics as specified in the appended claims.

BRIEF DESCRIPTION OF THE DRAWING

For a better appreciation of the characteristics and the advantages of the invention, the latter will be further described by way of non-limiting example with reference to the accompanying drawings in which:

FIGS. 1B and 1A show block diagram of a preferred embodiment of the cooking system according to the invention.

DETAILED DESCRIPTION OF THE PREFERRED EMBODIMENTS

Figure 1:
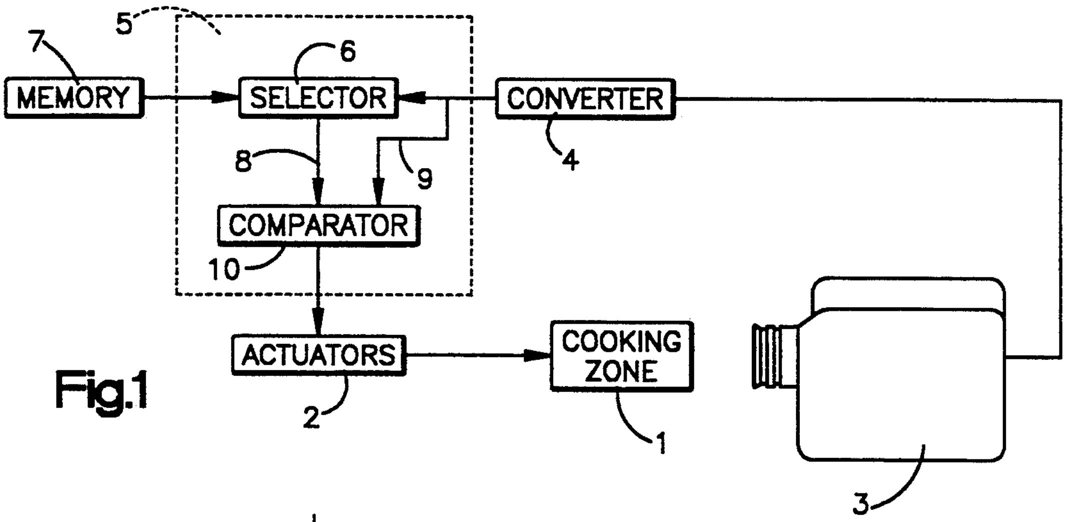
Figure 1A:
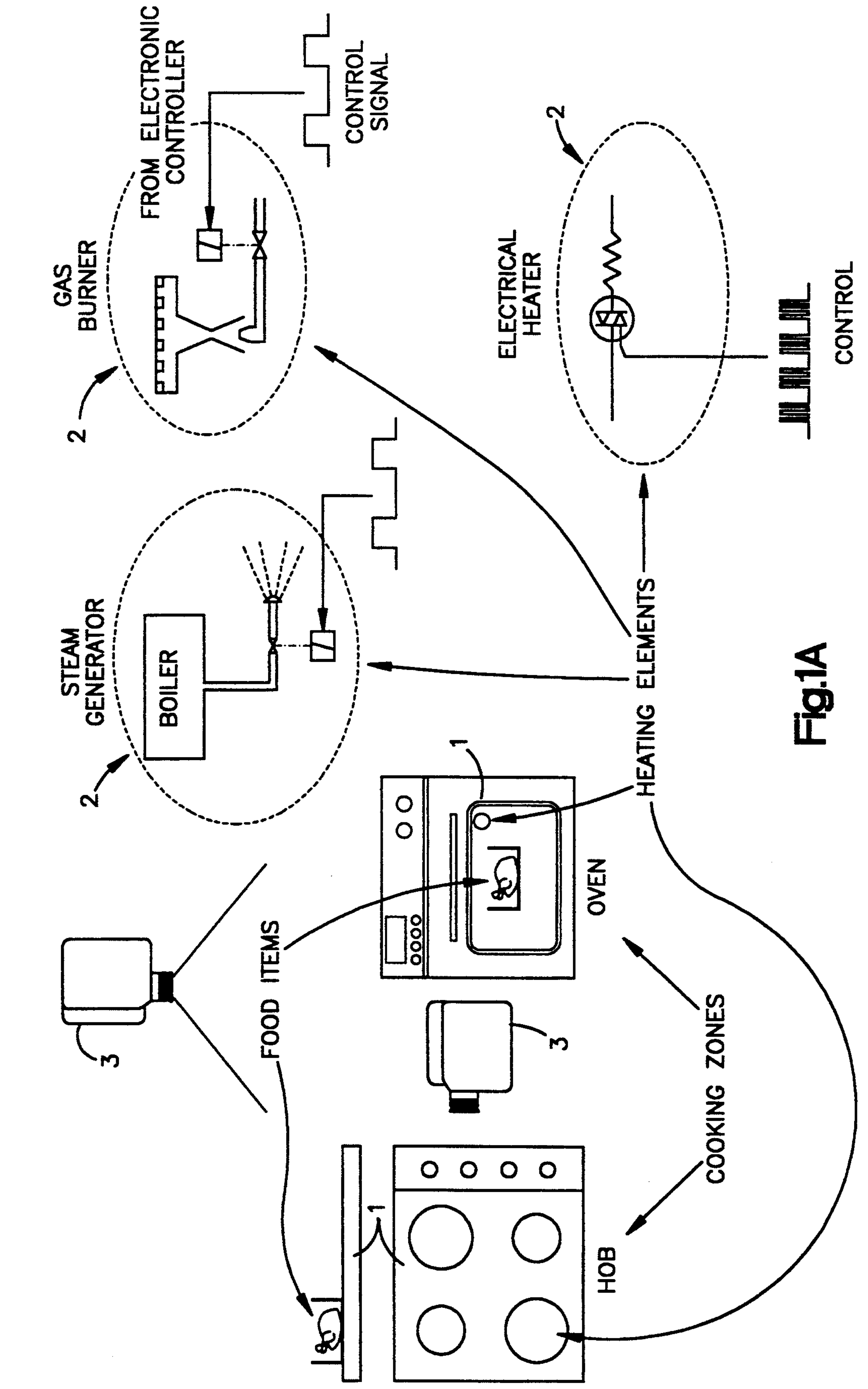
FIG. 1A shows a cooking apparatus and actuators according to the invention.

Referring to FIG. 1A, it can be noticed that the cooking system according to the present invention substantially comprises at least a cooking zone which is generally referred to with the reference numeral 1 in this context. Such a cooking zone may for instance comprise a cooking surface, or an oven, which may in turn be of different kind and design, and may also be provided with a plurality of adjustable actuating and control means which are generally referred to with the reference numeral 2 in t his context. According to the type of cooking zone and the characteristics thereof, said actuating and control means 2 may comprise heating elements (electric, gas-fuel led or similar elements), controlled or energized valves for steam supply, fans for forced hot-air circulation, microwave generators, etc. In turn, said heating elements may be of a composite type, i.e. made up by a plurality of parts or sections that can be energized selectively in order to modulate or vary not only the heating power input used to cook the food, but also the actual area from which the heating energy has to be issued in correspondence of the cooking zone 1.

Anyway, all such elements and devices can be of a per se known type and easily found by anyone skilled in the art.

According to a feature of the present invention, however, the cooking system further comprises artificial vision means 3 capable of monitoring said cooking zone 1. Such artificial vision means 3 comprise for instance at least such an imaging means as preferably a colour television cam era, or an infrared television camera. However, they may alternatively comprise some other equivalent monitoring means, capable of performing substantially the same task, such as for instance appropriate opto-electronic devices comprising photodiode arrays. In a per se known manner, said television camera 3 generates a control video signal comprising information data relating to the actual operational conditions prevailing in the cooking zone 1. In particular, said information data may be related to the type of food that is placed for cooking, possibly in an appropriate pan or utensil, in the cooking zone 1, as well as to the dimensions, the shape and the cooking condition or extent of the same food. Furthermore, the information data of said signal generated by the television camera 3 may extend to cover the temperature of the monitored zone, the moisture, the extent or degree of fan-assisted air circulation, if any, the direction from which the thermal energy, i.e. the heat generated by the heating elements is reaching the food being cooked, etc. As anyone skilled in the art will easily appreciate, all such information data are inherently contained in the control video signal generated by such television camera 3, particularly if it is an infrared television camera, and are therefore capable of being appropriately derived from the control signal itself.

Figure 1B:
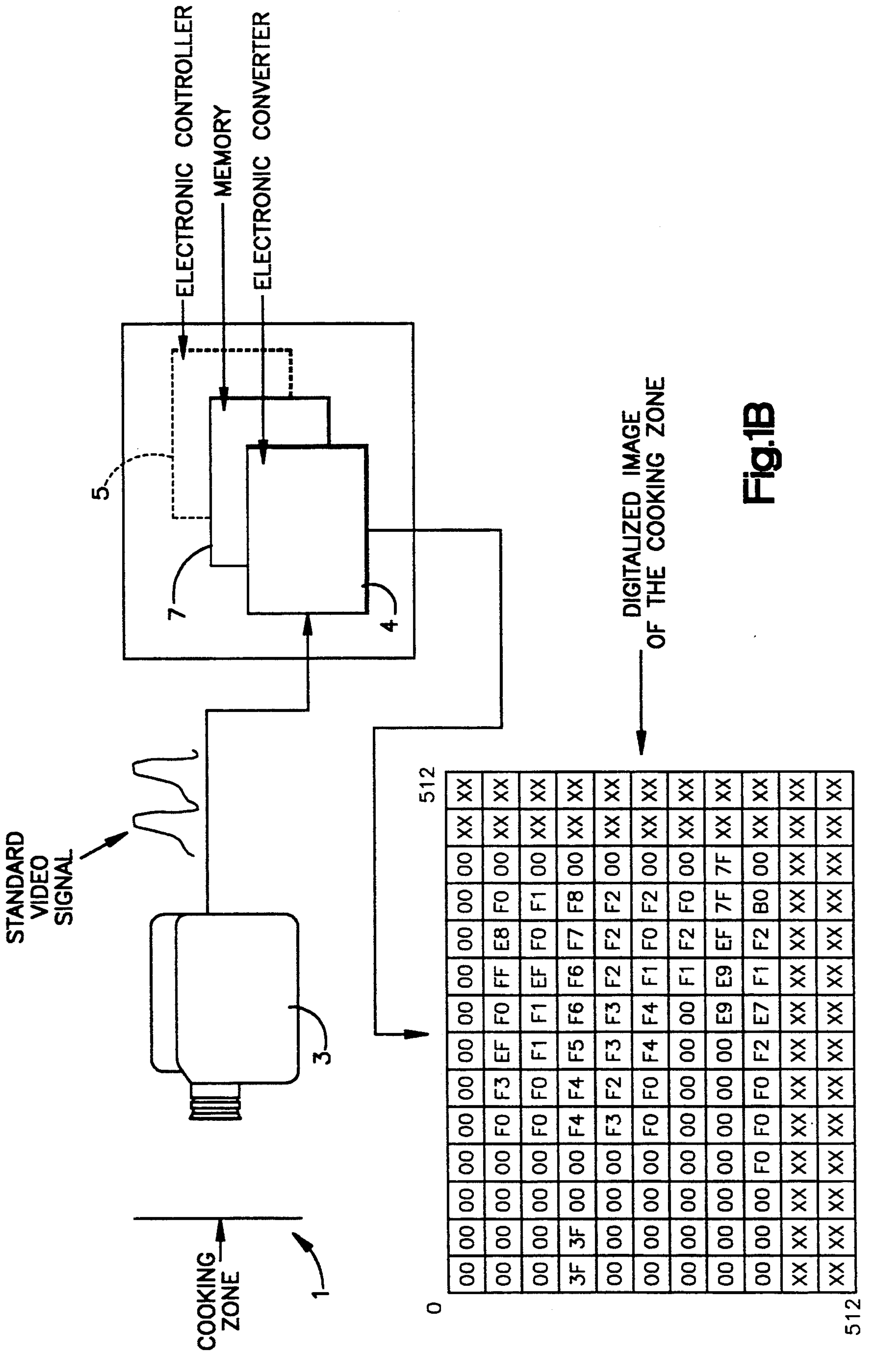

Referring to FIG. 1B, said control signal drives a processor means 5 through a converter stage 4 capable of converting the information content of the control signal into corresponding digital signals. Said converter stage 4 may for instance comprise a Motorola 68040 microprocessor, whereas the processor means 5 may be constituted by an INTEL 80286 microprocessor.

Referring to FIG. IA, in particular, said processor means 5 comprises a selector stage 6 having a first input driven by the output of said converter stage 4, as well as a second input driven by the output of a memory 7 which may for instance be based on a magnetic storage support means such as a floppy disk or the like. The selector stage 6 has an output 8 that drives a corresponding reference input of a comparator stage 10, which is also provided with a driving input 9 connected to the output of the converter stage 4.

According to the signals being applied to its own inputs 8 and 9, said comparator stage 10 is arranged to generate at its output corresponding error signals that drive, in a per se known manner, corresponding actuating means 2 of the cooking system.

Said output of the comparator stage 10 is illustrated schematically in FIG. 1. However, it can of course be understood as being constituted by a plurality of outputs connected each one to corresponding actuating means of the cooking system.

In the memory 7 there are stored a plurality of predetermined typical cooking programs, each one of them being constituted by a different combinations of process parameters that may for instance be indicative of the nature and the shape of the food item to be cooked, its weight and/or volume, the ideal moisture degree of the cooking zone 1, the temperature, the degree of ventilation, the characteristics of the container in which the food to be cooked may possibly be accomodated, the degree or extent to which the food has to be cooked, etc. Anyone skilled in the art will clearly appreciate that such parameters contributing to form the various typical cooking programs may be in a quite large number, differing from each other and variously combined with each other, according to the various needs.

In order to exemplify the point, a typical cooking program may provide for a certain food item of a given type or nature to be cooked under temperature, moisture and ventilation conditions that vary throughout the cooking process in view of achieving an optimal final cooking result. In any case, the parameters of the cooking program that are stored in the memory 7 correspond to respective information contents available in the control signal which is generated by the television camera 3, and which drives the processor means 5 through said converter stage 4.

The selector stage 6 is arranged so as to be capable of conveying to its output 8, in response to the information contained in the control signal received from the converter stage 4, the most suitable one among the various cooking programs being stored in the memory 7. For instance, if the information contained in the control signal are indicating that the food item placed in the cooking zone 1 is a piece of meat having a given size and/or shape, said selector stage 6 will therefore convey to its output 8 that typical cooking program stored in the memory 7 which appears as being the most suited to an optimal preparation of the food item concerned.

Therefore, the combination of parameters forming the cooking program selected each time according to the afore described criteria drives the reference input of the comparator stage 10, which in turn compares said parameters with the corresponding information contained in the control signal being applied to its driving input 9. Each one of the parameters of the selected cooking program is compared by the comparator stage 10 with the corresponding information of the control signal, i.e. with the corresponding information out of the cooking process which the food item placed in the cooking zone 1 is actually going through. For the information content of the control signal, any possibly emerging difference with respect to the corresponding parameters stored in the cooking program selected by the system will cause the comparator stage 10 to generate at its output a corresponding error signal which drives the actuating means 2 associated therewith so as to adapt in an optimal way the cooking conditions called for by the selected cooking program to the conditions under which the concerned food item is actually being processed. In other words, this means that the ideal typical cooking program selected each time by the system is automatically adapted to the actual process parameters that are detected by the system as prevailing in the cooking zone 1, such as for instance the actual size of the food item to be cooked, so as to achieve the best possible ultimate result.

Figure 2:
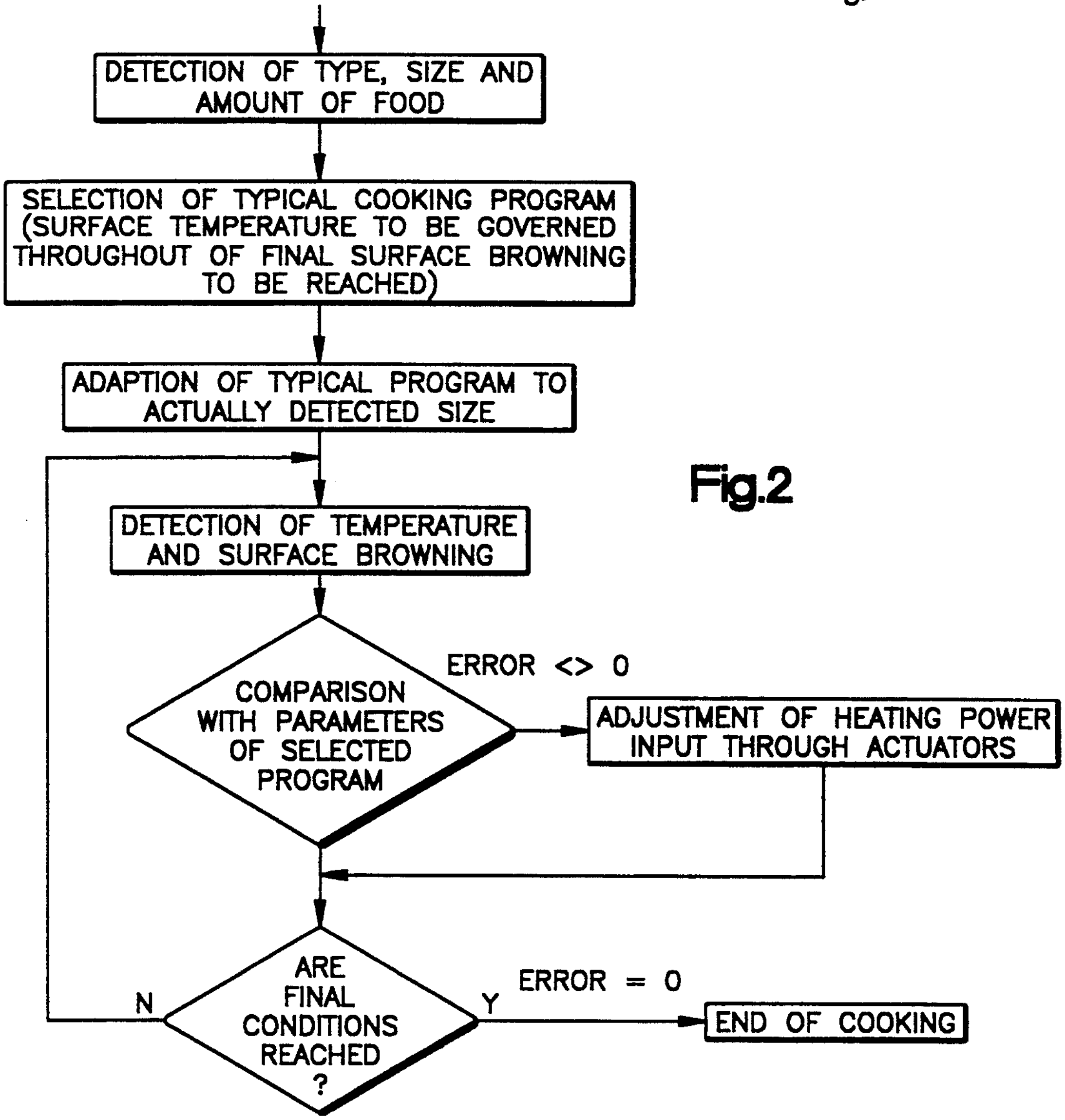
FIG. 2 is a view showing a flow-chart relating to the operation of the cooking system shown in FIG. 1.

The afore described operation of the processor means 5 is solely illustrated by way of non-limiting example in the flow-chart appearing in FIG. 2, where for the sake of simplicity it is assumed that the cooking process is controlled on the basis of two fundamental parameters, i.e. surface temperature of the food and desired extent of final surface browning.

From the description appearing above it clearly ensues that the cooking system according to the present invention enables the following main advantages to be substantially achieved as compared with all prior-art cooking systems:

- fully automatic operation on the basis of a number of programmed reference 'menus' (i.e. cooking programs stored in the memory 7);
- automatic identification of the type of food item that has to be cooked in the cooking zone 1, and automatic selection of the most suitable cooking program accordingly;
- continuous monitoring of the on-going cooking process, under self-regulation of the whole system depending on the actual cooking or process conditions prevailing in the cooking zone 1;
- high operating accuracy of the automatic system, thanks to the high number of information data that can be derived from the signal generated by the television camera 3 and the corresponding large number of parameters that can be controlled therethrough;
- capability of the system of being applied to and used in conjunction with any type of cooking appliance.

It will be appreciated that the automatically controlled cooking system that has been described here by way of non-limiting example only, may be the subject of any modification considered to be appropriate, without departing from the scope of the present invention. For instance, depending on special needs the cooking zone 1 may even be controlled by further sensors adapted to drive the processor means 5 with additional data relating to actual conditions prevailing in said cooking zone.

We claim:

1. Automatically controlled cooking system, comprising at least a cooking zone (1) and a plurality of actuator means (2) associated with the cooking zone that are adjustable so as to vary respective parameters determining a cooking process to handle a food item placed in correspondence of said cooking zone, characterized in that the cooking system further comprises artificial vision means (3) positioned for monitoring said cooking zone (1); processor means (5) driven by said artificial vision means; a control signal from said artificial vision means to said processor means and containing information data relating to actual process conditions prevailing in said cooking zone (1); memory means (7) associated with said processor means; a plurality of typical cooking programs stored in said memory means each program made up by different combinations of said parameters, said processor means (5) acting in response to the information data of the control signal to select the most suitable one among the cooking programs and to compare the parameters thereof with corresponding information data of the control signal to drive said actuator means (2) with relevant error signals associated with said parameters, so as to automatically regulate the cooking process for said food item depending on the information data of the control signal generated by said artificial vision means (3).

2. Cooking system according to claim 1, characterized in that said artificial vision means (3) comprise a color television camera.

3. Cooking system according to claim 1, characterized in that said artificial vision means (3) comprise an infrared television camera.

4. Cooking system according to claim 1, further comprising converter means (4) disposed between the artificial vision means and the processor means and adapted to convert said control signal into a corresponding digital signal.

* * * * *